United States Patent

Hashimoto

(10) Patent No.: US 8,412,005 B2
(45) Date of Patent: Apr. 2, 2013

(54) MACH-ZEHNDER INTERFEROMETER TYPE OPTICAL MODULATOR

(75) Inventor: Jun-ichi Hashimoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 224 days.

(21) Appl. No.: 13/038,809

(22) Filed: Mar. 2, 2011

(65) Prior Publication Data

US 2011/0235961 A1    Sep. 29, 2011

(30) Foreign Application Priority Data

Mar. 24, 2010   (JP) .................. 2010-068816

(51) Int. Cl.
*G02F 1/035* (2006.01)
(52) U.S. Cl. ....... 385/3; 385/1; 385/2; 385/14; 385/129; 385/130; 385/131; 385/132
(58) Field of Classification Search .................. 385/1, 2, 385/3, 14, 39, 40, 41, 42, 129, 130, 131, 385/132
See application file for complete search history.

(56) References Cited

U.S. PATENT DOCUMENTS

| | | | | |
|---|---|---|---|---|
| 5,754,714 | A | * | 5/1998 | Suzuki et al. ................ 385/5 |
| 6,954,568 | B2 | * | 10/2005 | Liu ................ 385/45 |
| 2011/0235961 | A1 | * | 9/2011 | Hashimoto ................ 385/3 |

FOREIGN PATENT DOCUMENTS

| | | |
|---|---|---|
| JP | 62-183406 | 8/1987 |
| JP | 2005-99387 | 4/2005 |

OTHER PUBLICATIONS

C. Rolland et al., "10 Gbit/s, 1.56μ Multiquantum Well InP/InGaAsP Mach-Zehnder Optical Modulator", Electronics Letters, vol. 29, No. 5, Mar. 4, pp. 471-472, 1993.

* cited by examiner

*Primary Examiner* — Brian Healy
(74) *Attorney, Agent, or Firm* — Smith, Gambrell & Russell, LLP

(57) ABSTRACT

A Mach-Zehnder interferometer type optical modulator includes first and third optical waveguides; input and output optical couplers; and a phase shifting section disposed between the input and output optical couplers. The phase shifting section includes first and second optical waveguide structures each including an n-type semiconductor section, a core layer and a cladding layer. The cladding layer of the first optical waveguide structure includes a first section disposed on the core layer, and second and third sections disposed on the first section. The second and third sections are juxtaposed to each other in a direction that intersects a waveguiding direction. The first and second sections are composed of a p-type semiconductor, and the third section is composed of an undoped semiconductor.

11 Claims, 15 Drawing Sheets

MACH-ZEHNDER INTERFEROMETER TYPE OPTICAL MODULATOR

BACKGROUND OF THE INVENTION

1. Field of the Invention

The present invention relates to a Mach-Zehnder interferometer type optical modulator.

2. Description of the Related Art

Patent Document 1 (Japanese Unexamined Patent Application Publication No. 62-183406) describes a waveguide-type optical interferometer. This waveguide-type optical interferometer includes a substrate, two optical guides composed of glass or a plastic formed on the substrate, two optical couplers that connect the optical waveguides to each other at different positions, and phase shifters disposed in the optical waveguides between the optical couplers. Each phase shifter includes a heater disposed on the optical waveguide. The optical path length of the optical waveguide is changed by controlling the temperature of the optical waveguide by heating the heater of the phase shifter.

In recent years, optical modulators that modulate light in response to electric signals from outside have become one of the essential components in configuring optical fiber communication systems and optical information processing systems. In particular, a Mach-Zehnder interferometer type optical modulator that uses a waveguide-type optical interferometer described in Patent Document 1 enables high-speed modulation of 40 Gbps or higher. Since Mach-Zehnder interferometer type optical modulators have a low wavelength chirp under high-speed modulation, Mach-Zehnder interferometer type optical modulators can be used for future ultra high-speed, high-capacity optical communication systems. In particular, Mach-Zehnder interferometer type optical modulators composed of semiconductors are small in size, have low power consumption, and can be monolithically integrated with other semiconductor optical devices such as a laser diode through to achieve wider versatility.

A Mach-Zehnder interferometer type optical modulator has an optical waveguide structure constituted by an upper cladding layer, a lower cladding layer, and a core layer between these cladding layers. The core layer is composed of a material having a refractive index higher than those of the upper cladding layer and the lower cladding layer. In particular, an optical waveguide structure of a semiconductor optical device has a pin structure in which one of the upper and lower cladding layers is composed of an n-type semiconductor, the other of the upper and lower cladding layers is composed of a p-type semiconductor, and the core layer is composed of an undoped semiconductor.

FIGS. 14, 15A, and 15B are diagrams showing one example of a structure of a Mach-Zehnder interferometer type optical modulator 100 using semiconductors. FIG. 14 is a plan view of the Mach-Zehnder interferometer type optical modulator 100. FIG. 15A is a cross-sectional view taken along line XVa-XVa in FIG. 14. FIG. 15B is a cross-sectional view taken along line XVb-XVb in FIG. 14.

As shown in FIG. 14, the Mach-Zehnder interferometer type optical modulator 100 includes a phase shifting section 110, an input optical coupler 120, an output optical coupler 130, and two optical waveguides 140 and 150. These components are formed on an n-type semiconductor substrate 101 (refer to FIGS. 15A and 15B). Each of the waveguides 140 and 150 has one end connected to the input optical coupler 120 and the other end connected to the output optical coupler 130. The phase shifting section 110 is interposed between the input optical coupler 120 and the output optical coupler 130. Anode electrodes 111a and 111b are respectively disposed on the optical waveguides 140 and 150 in the phase shifting section 110.

Referring now to FIGS. 15A and 15B, the Mach-Zehnder interferometer type optical modulator 100 includes an n-type lower cladding layer 103, core layers 104a and 104b, p-type upper cladding layers 105a and 105b, and p-type contact layers 106a and 106b. The core layer 104a is interposed between the n-type lower cladding layer 103 and the p-type upper cladding layer 105a. The core layer 104b is interposed between the n-type lower cladding layer 103 and the p-type upper cladding layer 105b. The p-type contact layers 106a and 106b are disposed on the p-type upper cladding layers 105a and 105b, respectively. The anode electrodes 111a and 111b are disposed on the p-type contact layers 106a and 106b, respectively. A cathode electrode 112 is formed on the back of the n-type semiconductor substrate 101.

A part of the n-type lower cladding layer 103, the core layer 104a, the p-type upper cladding layer 105a, and the p-type contact layer 106a form a mesa structure 107a. The mesa structure 107a constitutes the optical waveguide 140. Similarly, another part of the n-type lower cladding layer 103, the core layer 104b, the p-type upper cladding layer 105b, and the p-type contact layer 106b form another mesa structure 107b. The mesa structure 107b constitutes the optical waveguide 150. Side surfaces of the mesa structures 107a and 107b are buried by, for example, a polyimide resin 108.

According to the Mach-Zehnder interferometer type optical modulator 100, the refractive indices of the core layers 104a and 104b can be changed by applying a reverse bias voltage between the cathode electrode 112 and the anode electrodes 111a and 111b. As a result, the phase of the light guided in the core layers 104a and 104b can be shifted.

SUMMARY OF THE INVENTION

For the Mach-Zehnder interferometer type optical modulator 100, the p-type impurity concentrations in the p-type upper cladding layers 105a and 105b are set to relatively high levels (e.g., $10^{18}$ to $10^{19}$ cm$^{-3}$) to form a pin structure. The p-type contact layers 106a and 106b need to have a yet higher dopant concentration (e.g., $10^{19}$ to $10^{20}$ cm$^{-3}$) in order to decrease the resistance with the anode electrodes 111a and 111b disposed thereon. When a p-type semiconductor layer has a high dopant concentration, the absorption loss of the guided light is large and the intensity of light propagating in the optical waveguides 140 and 150 is attenuated. Moreover, since the electrical resistance between the optical waveguides is small, leakage current occurs between the optical waveguides. It has been found that cross-talk occurs between the optical waveguides due to the leakage current. Accordingly, it is difficult to decrease the optical absorption loss of guided light and increase the modulation rate by taking the structure such as this Mach-Zehnder interferometer type optical modulator.

An aspect of the present invention provides a Mach-Zehnder interferometer type optical modulator including a first optical waveguide and a second optical waveguide, an input optical coupler optically connected to one end of each of the first and second optical waveguides, an output optical coupler optically connected to the other end of each of the first and second optical waveguides, and a phase shifting section disposed between the input optical coupler and the output optical coupler. The phase shifting section constitutes part of the first optical waveguide and part of the second optical waveguide and includes a first optical waveguide structure and a second optical waveguide structure each including an n-type semiconductor section, a core layer on the n-type semiconductor section, and a cladding layer on the core layer. The cladding layer of the first optical waveguide structure includes a first section disposed on the core layer of the first optical waveguide structure, and a second section and a third section disposed on the first section, the second section and the third section being juxtaposed to each other in a direction that intersects a waveguiding direction of the first optical waveguide structure. The cladding layer of the second optical waveguide structure includes a fourth section disposed on the core layer of the second optical waveguide structure, and a fifth section and a sixth section disposed on the fourth section, the fifth section and the sixth section being juxtaposed to each other in a direction that intersects a waveguiding direction of the second optical waveguide structure. The first section, the second section, the fourth section, and the fifth section are composed of a p-type semiconductor, and the third section and the sixth section are composed of an undoped semiconductor.

According to the Mach-Zehnder interferometer type optical modulator, the cladding layer of the first optical waveguide structure of the phase shifting section includes the first section, the second section, and the third section. The first section composed of a p-type semiconductor is disposed on the core layer and a pin structure is formed by the core layer sandwiched between the p-type first section and the n-type semiconductor section. The second section composed of a p-type semiconductor is disposed on the first section and transfers an electrical signal applied to the first anode electrode to the first section. The third section is also formed on the first section by being juxtaposed to the second section. The cladding layer of the second optical waveguide structure of the phase shifting section includes the fourth section, the fifth section, and the sixth section. The fourth section composed of a p-type semiconductor is disposed on the core layer and a pin structure is formed by the core layer sandwiched between the p-type fourth section and the n-type semiconductor section. The fifth section composed of a p-type semiconductor is disposed on the fourth section and transfers an electrical signal applied to the second anode electrode to the fourth section. The sixth section is also formed on the fourth section by being juxtaposed to the fifth section. Since the third and sixth sections are composed of an undoped semiconductor, the optical absorption loss can be reduced when compared with the second and fifth sections composed of a p-type semiconductor. According to this Mach-Zehnder interferometer type optical modulator, the optical absorption loss in the phase shifting section can be reduced compared to the case where all of the cladding layers are composed of a p-type semiconductor.

The first and second optical waveguide structures of the Mach-Zehnder interferometer type optical modulator may each have a mesa structure that includes part of the n-type semiconductor section, the core layer, and the cladding layer. Side surfaces of the mesa structure may be buried by a resin layer. The resin layer may be composed of a polyimide resin or a benzocyclobutene (BCB) resin.

The Mach-Zehnder interferometer type optical modulator may further include a first electrode and a second electrode respectively disposed on cladding layers of the first optical waveguide structure and the second optical waveguide structure.

At least one of the first and second optical waveguides excluding the phase shifting section, the input optical coupler, and the output optical coupler of the Mach-Zehnder interferometer type optical modulator may have a third waveguide structure that includes a core layer and a cladding layer disposed on the core layer. The cladding layer of the third optical waveguide structure may include a seventh section disposed on the core layer of the third optical waveguide structure and an eighth section disposed on the seventh section. The seventh section may be composed of a p-type semiconductor and the eighth section may be composed of an undoped semiconductor.

Since no electric field is applied to the core layers of the first and second optical waveguides excluding the phase shifting section, the input optical coupler, and the output optical coupler, there is no need to impart electrical conductivity to the cladding layers. Accordingly, all regions other than the seventh sections inevitably formed together with the first sections of the cladding layers of the phase shifting section during manufacturing can be made of an undoped material so that the optical absorption loss and the like that occur in the first and second optical waveguides excluding the phase shifting section, the input optical coupler, and the output optical coupler can be reduced.

The Mach-Zehnder interferometer type optical modulator may further include a first p-type contact layer disposed on the second section and having a dopant concentration higher than that in the second section, and a second p-type contact layer disposed on the fifth section and having a dopant concentration higher than that in the fifth section. In this manner, electrical signals applied to the first anode electrode on the first p-type contact layer can be efficiently transmitted to the first and second sections. Similarly, electrical signals applied to the second anode electrode on the second p-type contact layer can be efficiently transmitted to the fourth and fifth sections.

The first p-type contact layer of the Mach-Zehnder interferometer type optical modulator may extend across the second section and the third section. The second p-type contact layer of the Mach-Zehnder interferometer type optical modulator may extend across the fifth section and the sixth section. In this manner, the contact area between the first anode electrode and the first p-type contact layer can be increased and the contact resistance can be reduced. Similarly, the contact area between the second anode electrode and the second p-type contact layer can be increased and the contact resistance can be reduced. As a result, the device resistance is decreased and electrical signals can be transferred to the fourth and fifth sections with a lower voltage. In other words, the Mach-Zehnder interferometer type optical modulator can be operated at a lower voltage and a lower power consumption.

The Mach-Zehnder interferometer type optical modulator may further include a first electrode and a second electrode respectively disposed on cladding layers of the first optical waveguide structure and the second optical waveguide structure, and the first and second electrodes may be in contact with the first and second p-type contact layers, respectively.

The core layers of the first and second optical waveguide structures of the Mach-Zehnder interferometer type optical modulator may be composed of a semiconductor material selected from InP, GaInAsP, AlGaInAs, AlInAs, and GaInAs.

The cladding layers and the n-type semiconductor sections of the first and second optical waveguide structures of the Mach-Zehnder interferometer type optical modulator may be composed of InP.

DESCRIPTION OF THE PREFERRED EMBODIMENTS

Figure 1:
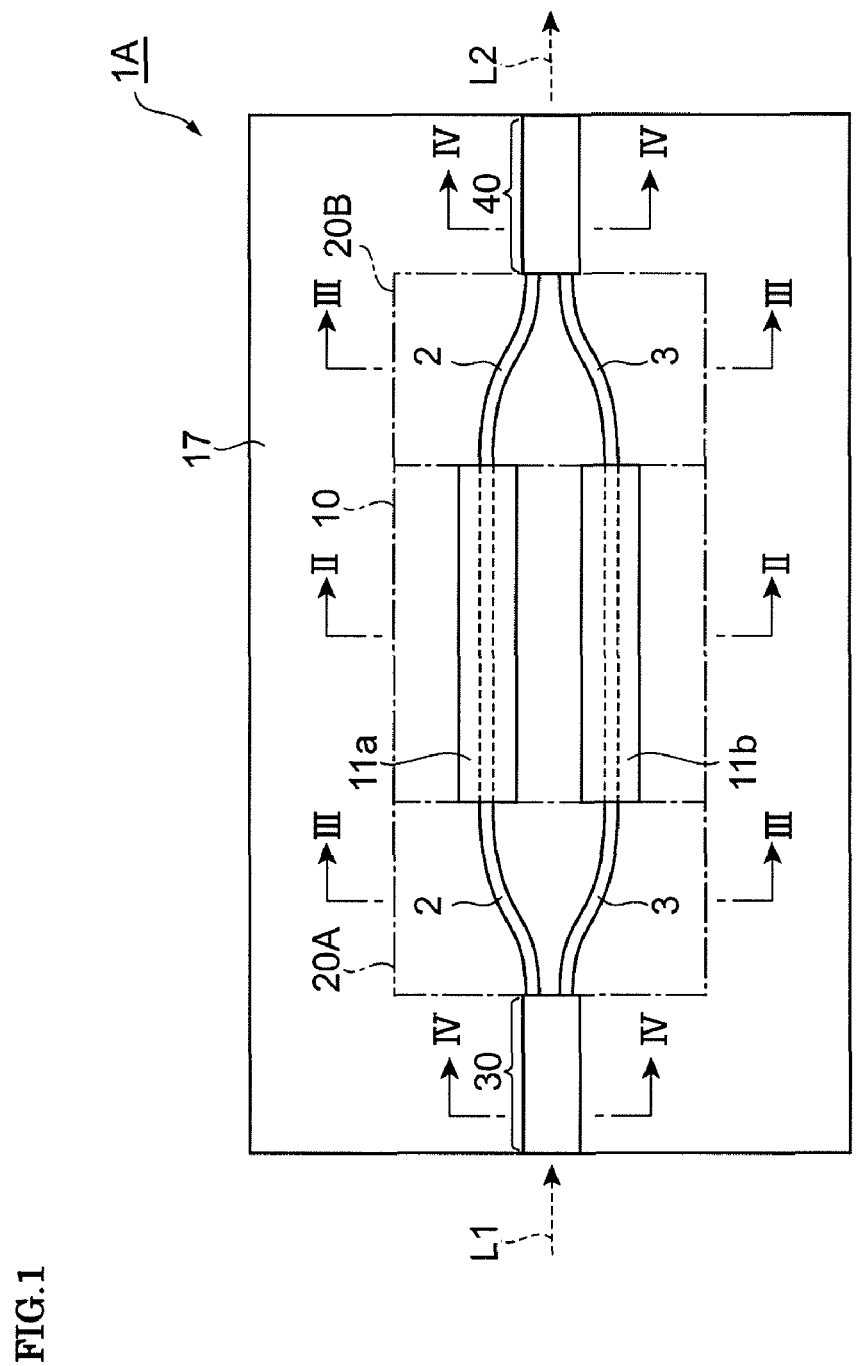
FIG. 1 is a plan view showing a structure of a Mach-Zehnder interferometer type optical modulator 1A according to an embodiment of the present invention.

Embodiments of the Mach-Zehnder interferometer type optical modulator of the present invention will now be described in detail with reference to the attached drawings. In the description of the drawings, the same components are given the same reference numerals and the description therefor is omitted to avoid redundancy.

First Embodiment

Figure 2:
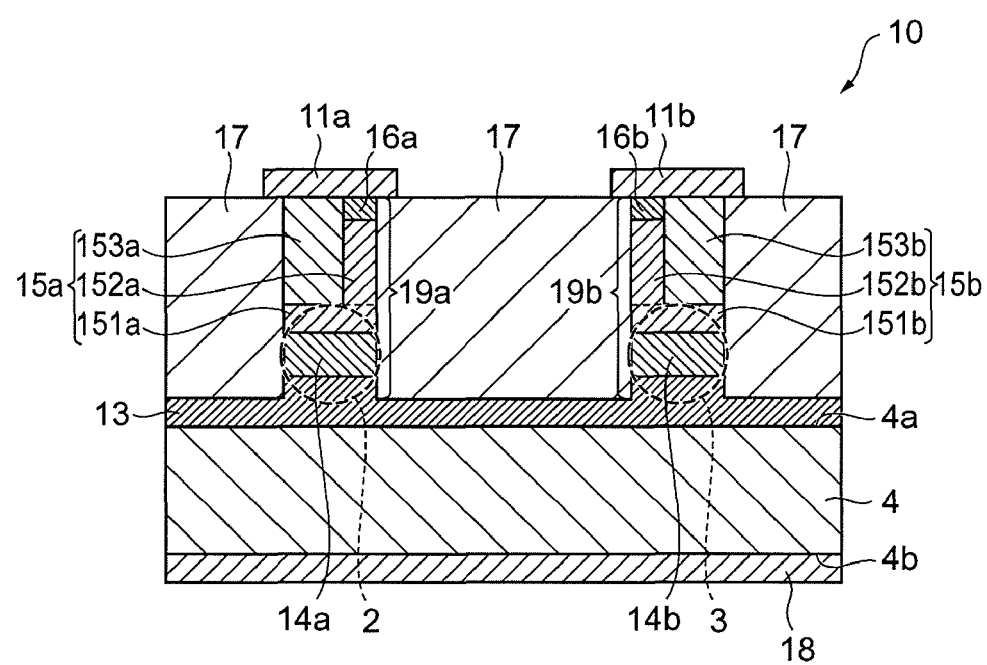
FIG. 2 is a cross-sectional view of the Mach-Zehnder interferometer type optical modulator 1A shown in FIG. 1 taken along line II-II.
Figure 3:
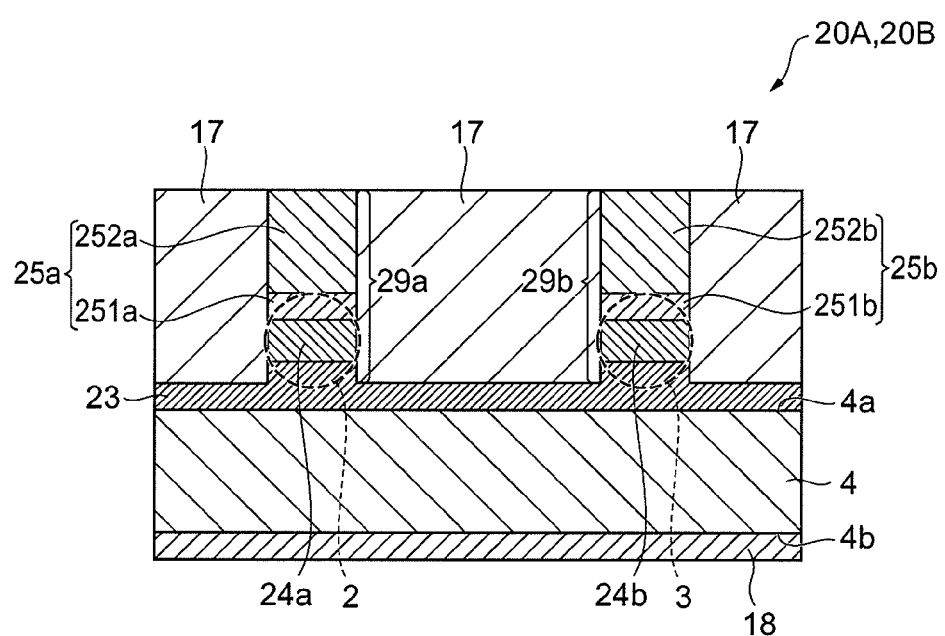
FIG. 3 is a cross-sectional view of the Mach-Zehnder interferometer type optical modulator 1A shown in FIG. 1 taken along line III-III.
Figure 4:
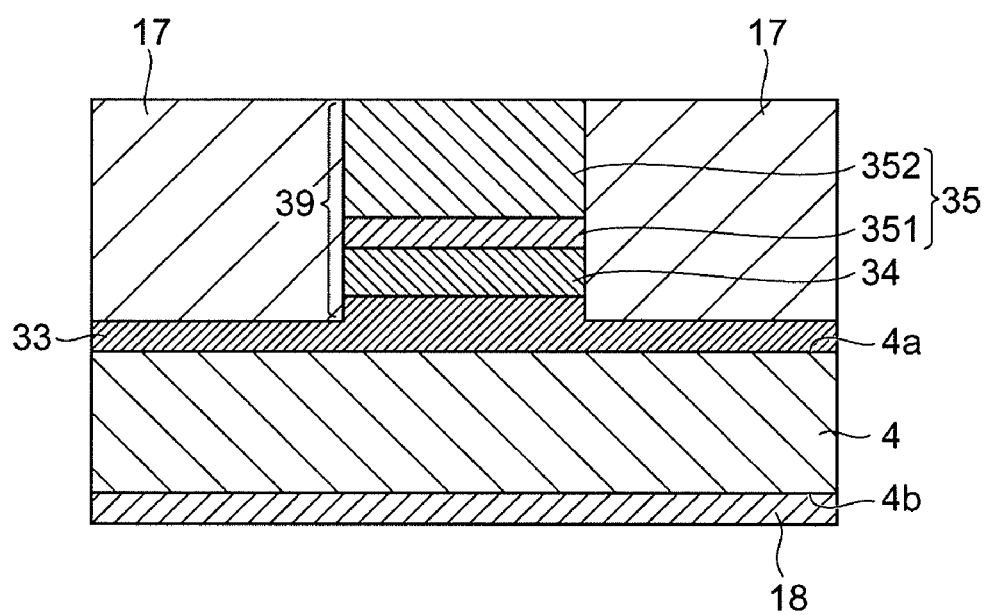
FIG. 4 is a cross-sectional view of the Mach-Zehnder interferometer type optical modulator 1A shown in FIG. 1 taken along line IV-IV.

FIGS. 1 to 4 are diagrams showing a structure of a Mach-Zehnder interferometer type optical modulator 1A according to a first embodiment. FIG. 1 is a plan view showing a structure of the Mach-Zehnder interferometer type optical modulator 1A. FIGS. 2, 3, and 4 are cross-sectional views of the Mach-Zehnder interferometer type optical modulator 1A shown in FIG. 1 taken along line II-II, line III-III, and line IV-IV, respectively.

Referring to FIG. 1, the Mach-Zehnder interferometer type optical modulator 1A of this embodiment includes a phase shifting section 10, waveguiding sections 20A and 20B, an input optical coupler 30, and an output optical coupler 40. The phase shifting section 10 is disposed between the input optical coupler 30 and the output optical coupler 40. The waveguiding section 20A is disposed between the input optical coupler 30 and the phase shifting section 10. The waveguiding section 20B is disposed between the phase shifting section 10 and the output optical coupler 40. The phase shifting section 10, the waveguiding sections 20A and 20B, the input optical coupler 30, and the output optical coupler 40 are formed on an n-type semiconductor substrate 4 as shown in FIGS. 2 to 4. An n-type InP substrate can be used as the n-type semiconductor substrate 4, for example.

The Mach-Zehnder interferometer type optical modulator 1A also includes two optical waveguides 2 and 3. The optical waveguide 2 is a first optical waveguide according to this embodiment and the optical waveguide 3 is a second optical waveguide according to this embodiment. The optical waveguides 2 and 3 extend across the waveguiding section 20A, the phase shifting section 10, and the waveguiding section 20B. The optical waveguides 2 and 3 are provided in parallel with each other in an extending direction. The optical waveguides 2 and 3 may have the same optical length. However, the optical waveguides 2 and 3 may have different optical lengths. Each of the optical waveguides 2 and 3 has one end connected to the input optical coupler 30 and the other end connected to the output optical coupler 40. Anode electrodes 11a and 11b are respectively disposed on the optical waveguides 2 and 3 in the phase shifting section 10.

The input optical coupler 30 branches incoming light L1 coming into the Mach-Zehnder interferometer type optical modulator 1A from outside to the optical waveguide 2 and the optical waveguide 3. The output optical coupler 40 combines the light that has propagated through the optical waveguides 2 and 3. The input optical coupler 30 and the output optical coupler 40 are each constituted by, for example, a multimode interference (MMI) coupler. In the phase control section 10, the refractive indices of the optical waveguides 2 and 3 are changed so that the phase of light is controlled.

Referring now to FIG. 2, the phase shifting section 10 includes an n-type lower cladding layer 13, a cathode electrode 18, and two mesa structures 19a and 19b in addition to the anode electrodes 11a and 11b described above. The n-type lower cladding layer 13 constitutes an n-type semiconductor section of this embodiment together with the n-type semiconductor substrate 4. The n-type lower cladding layer 13 covers the entirety of a main surface 4a of the n-type semiconductor substrate 4. The mesa structure 19a is formed on the section corresponding to the optical waveguide 2 on the n-type lower cladding layer 13. The mesa structure 19b is formed on the section corresponding to the optical waveguide 3 on the n-type lower cladding layer 13.

The mesa structure 19a constitutes an optical waveguide structure (first optical waveguide structure) of this embodiment. The mesa structure 19a includes part of the n-type lower cladding layer 13, a core layer 14a, an upper cladding layer 15a, and a p-type contact layer 16a.

The core layer 14a may be composed of an undoped semiconductor. The core layer 14a is disposed on the n-type lower cladding layer 13 and the upper cladding layer 15a is disposed on the core layer 14a. The refractive index of the core layer 14a is larger than those of the n-type lower cladding layer 13 and the upper cladding layer 15a. These layers of the mesa structure 19a constitute part of the optical waveguide 2 with the core layer 14a at the center.

The core layer 14a may be composed of a semiconductor such as GaInAsP, AlGaInAs, AlInAs, and GaInAs. These semiconductor materials can be lattice-matched to InP. Accordingly, a core layer 14a having good crystal quality can be formed on the InP substrate. These semiconductor materials also have a band gap energy corresponding to the wavelength band used in optical fiber communication, i.e., 1.3 µm to 1.55 µm. Accordingly, when the core layer 14a is composed of such a semiconductor material, an optical modulator suitable for optical communication usage can be obtained. The core layer 14a may be a single layer (bulk layer) or may have a quantum well structure constituted by alternately stacked well layers and barrier layers.

The upper cladding layer 15a includes a first section 151a, a second section 152a, and a third section 153a. The first section 151a is on the core layer 14a so as to entirely form an interface between the upper cladding layer 15a and the core layer 14a. The second section 152a and the third section 153a are disposed on the first section 151a and are juxtaposed in a direction intersecting the waveguiding direction of the optical waveguide 2. In this embodiment, the second section 152a is formed along a side surface of the mesa structure 19a opposing the other mesa structure 19b. The third section 153a is formed along the other side surface of the mesa structure 19a, the side surface being opposite the surface opposing the mesa structure 19b.

The first section 151a and the second section 152a are composed of a p-type semiconductor. The third section 153a is composed of an undoped semiconductor. The p-type semiconductor has an impurity concentration of, for example, more than $1 \times 10^{17}$ cm$^{-3}$. Zn impurity may be used as a p-type dopant. Here, the "undoped semiconductor" refers to a semiconductor to which an impurity element is not intentionally added. For example, an undoped semiconductor can be formed by not adding an impurity element during formation of the semiconductor layer by crystal growth. The impurity concentration in the undoped semiconductor may be, for example, not more than $1 \times 10^{16}$ cm$^{-3}$.

According to the manufacturing method described below, the second section 152a and the first section 151a are integrally formed. The third section 153a is formed separately in a step different from the step of making the first and second sections 151a and 152a.

The n-type lower cladding layer 13 and the upper cladding layer 15a are preferably composed of a semiconductor material having a refractive index smaller than that of the core layer 14a. For example, the n-type lower cladding layer 13 and the upper cladding layer 15a may be composed of a semiconductor material selected from InP, GaInAsP, AlGaInAs, and AlInAs.

The p-type contact layer 16a is a first p-type contact layer of this embodiment and is disposed on the second section 152a. The dopant concentration of the p-type contact layer 16a is higher than that of the second section 152a. The anode electrode 11a is a first electrode of this embodiment and is an ohmic electrode disposed on the p-type contact layer 16a. The semiconductor material constituting the p-type contact layer 16a is preferably GaInAs or GaInAsP, for example. A cathode electrode 18 is formed on the entire rear surface 4b of the n-type semiconductor substrate 4.

The mesa structure 19b is a second optical waveguide structure of this embodiment. The mesa structure 19b includes part of the n-type lower cladding layer 13, a core layer 14b, an upper cladding layer 15b, and a p-type contact layer 16b.

The core layer 14b may be composed of an undoped semiconductor. The core layer 14b is disposed on the n-type lower cladding layer 13 and the upper cladding layer 15b is disposed on the core layer 14b. The refractive index of the core layer 14b is larger than those of the n-type lower cladding layer 13 and the upper cladding layer 15b. These layers of the mesa structure 19b constitute part of the optical waveguide 3 with the core layer 14b at the center.

The core layer 14b is preferably composed of the same semiconductor material as that of the core layer 14a described above. As a result, a core layer 14b having good crystal quality can be grown on the n-type semiconductor substrate 4 composed of InP. The core layer 14b may be a single layer or may have a quantum well structure.

The upper cladding layer 15b includes a fourth section 151b, a fifth section 152b, and a sixth section 153b. The fourth section 151b is disposed on the core layer 14b so as to entirely form an interface between the upper cladding layer 15b and the core layer 14b. The fifth section 152b and the sixth section 153b are disposed on the fourth section 151b and are juxtaposed in a direction intersecting the waveguiding direction of the optical waveguide 3. In this embodiment, the fifth section 152b is formed along a side surface of the mesa structure 19b opposing the other mesa structure 19a. The sixth section 153b is formed along the other side surface of the mesa structure 19b, the side surface being opposite the surface opposing the mesa structure 19a.

The fourth section 151b and the fifth section 152b are composed of a p-type semiconductor. The sixth section 153b is composed of an undoped semiconductor. According to the manufacturing method described below, the fifth section 152b and the fourth section 151b are integrally formed. The sixth section 153b is formed separately in a step different from the step of making the fourth section 151b and the fifth section 152b.

The upper cladding layer 15b is preferably composed of the same semiconductor material as that of the upper cladding layer 15a described above. In particular, when the upper cladding layer 15b is composed of InP, carriers and light can be tightly confined in the core layer 14b.

The p-type contact layer 16b is a second p-type contact layer of this embodiment and is disposed on the fifth section 152b. The dopant concentration of the p-type contact layer 16b is higher than that of the fifth section 152b. The anode electrode 11b is a second electrode of this embodiment and is an ohmic electrode disposed on the p-type contact layer 16b. The p-type contact layer 16b is composed of the same semiconductor material as that of the p-type contact layer 16a described above.

Both side surfaces of the mesa structures 19a and 19b are buried by a resin layer 17 composed of a benzocyclobutene (BCB) resin or a polyimide resin.

Referring now to FIG. 3, the waveguiding sections 20A and 20B have an n-type lower cladding layer 23 and two mesa structures 29a and 29b. The n-type cladding layer 23 may be integrally formed with the n-type lower cladding layer 13 of the phase shifting section 10. The mesa structures 29a and 29b are third mesa structures of this embodiment and formed on the sections of the n-type lower cladding layer 23 respectively corresponding to the optical waveguides 2 and 3.

The mesa structures 29a and 29b are third optical waveguide structures of this embodiment. The mesa structure 29a includes part of the n-type lower cladding layer 23, a core layer 24a, and an upper cladding layer 25a. The mesa structure 29b includes part of the n-type lower cladding layer 23, a core layer 24b, and an upper cladding layer 25b. Both side surfaces of the mesa structures 29a and 29b are buried by a resin layer 17 as with the mesa structures 19a and 19b of the phase shifting section 10.

The core layers 24a and 24b may be composed of an undoped semiconductor. The core layers 24a and 24b are formed on the n-type lower cladding layer 23. The upper cladding layers 25a and 25b are respectively formed on the core layers 24a and 24b. The refractive indices of the core layers 24a and 24b are larger than those of the n-type lower cladding layer 23 and the upper cladding layers 25a and 25b. These layers of the mesa structures 29a and 29b constitute part of the optical waveguides 2 and 3 with the core layers 24a and 24b at the center. The semiconductor material constituting the core layers 24a and 24b and the internal structure of the core layers 24a and 24b are the same as those of the core layers 14a and 14b described above.

The upper cladding layer 25a includes a seventh section 251a and an eighth section 252a. Similarly, the upper cladding layer 25b includes a seventh section 251b and an eighth section 252b. The seventh sections 251a and 251b are respectively disposed on the core layers 24a and 24b. The eighth sections 252a and 252b are respectively disposed on the seventh sections 251a and 251b. The seventh sections 251a and 251b are composed of a p-type semiconductor. The eighths sections 252a and 252b are composed of an undoped semiconductor. The semiconductor material constituting the n-type lower cladding layer 23 and the upper cladding layers 25a and 25b is the same as that of the n-type lower cladding layer 13 and the upper cladding layers 15a and 15b.

Referring now to FIG. 4, the input optical coupler 30 and the output optical coupler 40 each have an n-type lower cladding layer 33 and a mesa structure 39. The n-type cladding layer 33 may be integrally formed with the n-type lower cladding layer 13 of the phase shifting section 10. The mesa structure 39 is a third mesa structure of this embodiment and formed on part of the section on the n-type lower cladding layer 33.

The mesa structure 39 is a third optical waveguide structure of this embodiment. The mesa structure 39 includes part of the n-type lower cladding layer 33, a core layer 34, and an upper cladding layer 35. Both side surfaces of the mesa structure 39 are buried by the resin layer 17 as with the mesa structures 19a and 19b of the phase shifting section 10.

The core layer 34 may be composed of an undoped semiconductor. The core layer 34 is formed on the n-type lower cladding layer 33. The upper cladding layer 35 is formed on the core layer 34. The refractive index of the core layer 34 is larger than the refractive index of the n-type lower cladding layer 33 and the upper cladding layer 35. The core layer 34 of the input optical coupler 30 is optically connected to the core layers 24a and 24b of the waveguiding section 20A described above. Similarly, the core layer 34 of the output optical coupler 40 is optically connected to the core layers 24a and 24b of the waveguiding section 20B described above. The core layer 34 of the input optical coupler 30 is integrally formed with the core layers 24a and 24b of the waveguiding section 20A. The core layer 34 of the output optical coupler 40 is integrally formed with the core layers 24a and 24b of the waveguiding section 20B. The semiconductor material constituting the core layer 34 and the internal structure of the core layer 34 are the same as those of the core layers 14a and 14b described above.

The upper cladding layer 35 includes a seventh section 351 and an eighth section 352. The seventh section 351 is disposed on the core layer 34. The eighth section 352 is disposed on the seventh section 351. The seventh section 351 is composed of a p-type semiconductor. The eighth section 352 is composed of an undoped semiconductor. The semiconductor material constituting the n-type lower cladding layer 33 and the upper cladding layer 35 is the same as that of the n-type lower cladding layer 13 and the upper cladding layers 15a and 15b.

In this embodiment, MMI couplers are given as examples of the input optical coupler 30 and the output optical coupler 40. Alternatively, Y-branch couplers and directional couplers may be used instead.

Next, operation of the Mach-Zehnder interferometer type optical modulator 1A is described. Incoming light L1 (refer to FIG. 1) from outside the Mach-Zehnder interferometer type optical modulator 1A enters the core layer 34 of the input optical coupler 30. The incoming light L1 is branched to the optical waveguides 2 and 3 of the waveguiding section 20A. Then a branched light beam reaches the output optical coupler 40 via the phase shifting section 10 and the optical waveguides 2 and 3 of the waveguiding section 20B. These beams are optically coupled in the core layer 34 of the output optical coupler 40 and form outgoing light L2 emitted to outside the Mach-Zehnder interferometer type optical modulator 1A.

A reverse bias voltage is applied between the cathode electrode 18 and one or both of the anode electrodes 11a and 11b of the phase shifting section 10 to generate an electrical field in one or both of the core layer 14a and 14b. As a result, the refractive index of one or both of the core layer 14a and the core layer 14b can be changed due to the electro-optic effect or the quantum confined Stark effect (QCSE). Consequently, a phase difference is generated between the light propagating in the optical waveguides 2 and 3. Interference caused by the phase difference between light occurs in the output optical coupler 40 and intensity-modulated outgoing light L2 is generated.

According to the Mach-Zehnder interferometer type optical modulator 1A of this embodiment, the anode electrode 11a is electrically connected to the core layer 14a via the p-type contact layer 16a and the first section 151a and the second section 152a of the upper cladding layer 15a in the phase shifting section 10. Similarly, the anode electrode 11b is electrically connected to the core layer 14b via the p-type contact layer 16b and the fourth section 151b and the fifth section 152b of the upper cladding layer 15b. According to these structures, when a reverse bias voltage is applied between the anode electrodes 11a and 11b and the cathode electrode 18, a sufficient electric field can be applied to the core layers 14a and 14b.

According to the Mach-Zehnder interferometer type optical modulator 1A, the third section 153a and the sixth section 153b which are part of the upper cladding layers 15a and 15b are composed of an undoped semiconductor. An undoped semiconductor has a smaller optical absorption than a p-type semiconductor. Accordingly, for example, when compared to the structure shown in FIG. 15A, the optical absorption loss caused by the p-type semiconductor can be effectively reduced.

Figure 15A:
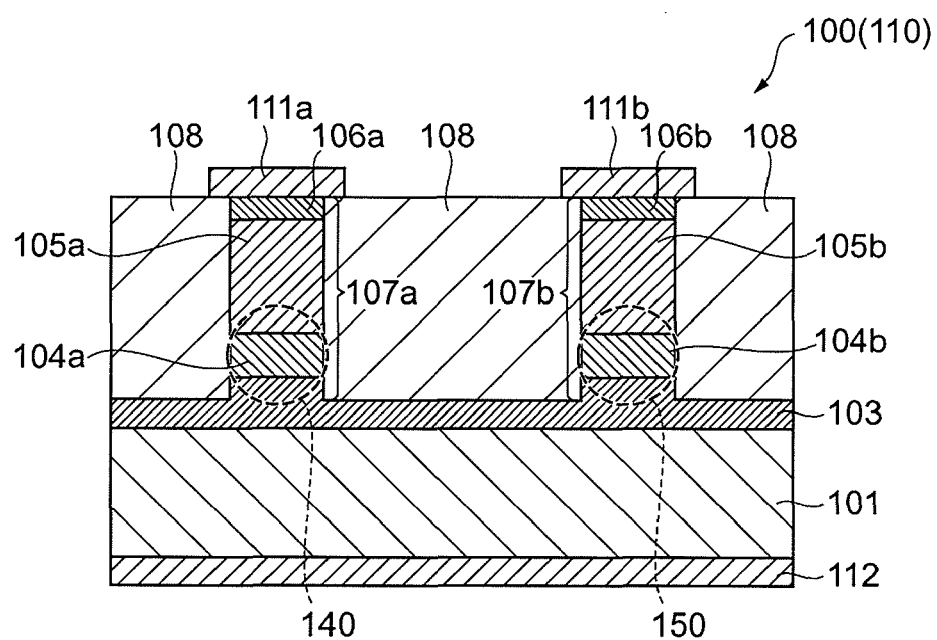
FIG. 15A is a cross-section taken along line XVa-XVa in FIG. 14

In the structure shown in FIG. 15A, a method for reducing the optical absorption loss caused by the p-type upper cladding layers 105a and 105b is to uniformly decrease the p-type dopant concentrations of the p-type upper cladding layers 105a and 105b. However, if the p-type dopant concentrations are uniformly decreased, the resistivity of the p-type upper cladding layers 105a and 105b will be increased. According to the Mach-Zehnder interferometer type optical modulator 1A of this embodiment, the third section 153a and the sixth section 153b which are part of the upper cladding layers 15a and 15b are composed of an undoped semiconductor, and thus the optical absorption loss can be effectively reduced. Furthermore, a low resistivity can be achieved by doping the second section 152a and the fifth section 152b with a sufficient amount of a p-type dopant. Although an undoped semiconductor has a resistivity greater than that of the p-type semiconductor, the increase in resistivity can be suppressed by using a p-type semiconductor having a high impurity concentration in the second section 152a and the fifth section 152b. In other words, according to the Mach-Zehnder interferometer type optical modulator 1A of this embodiment, the device resistivity can be reduced and the optical absorption loss caused by the p-type semiconductor can be decreased.

It should be noted that when the core layers 14a and 14b come into direct contact with the undoped semiconductor, leakage current will occur through the undoped semiconductor under application of reverse bias voltage. In contrast, according to the Mach-Zehnder interferometer type optical modulator 1A of this embodiment, the first section 151a and the fourth section 151b of the upper cladding layers 15a and 15b contact the core layers 14a and 14b and are composed of a p-type semiconductor. Thus, the leakage current can be suppressed.

According to the waveguiding sections 20A and 20B, the input optical coupler 30, and the output optical coupler 40, the seventh sections (251a, 251b, and 351) of the upper cladding layers 25a, 25b, and 35 contact the core layers 24a, 24b, and 34 and are composed of a p-type semiconductor. These seventh sections (251a, 251b, and 351) are formed simultaneously with the first section 151a and the fourth section 151b of the upper cladding layers 15a and 15b of the phase shifting section 10 during the manufacturing process. The rest of the sections, i.e., the eighth sections (252a, 252b, and 352) are composed of an undoped semiconductor. Moreover, no p-type contact layers are formed on the eighth sections 252a, 252b, and 352. When large part of the upper cladding layers 25a, 25b, and 35 is composed of an undoped semiconductor, the optical absorption loss caused by the p-type semiconductor can be reduced. There is no need to apply an electric field to the core layers 24a, 24b, and 34 in the waveguiding sections 20A and 20B, the input optical coupler 30, and the output optical coupler 40. Thus, device characteristics are not affected even when large part of the upper cladding layers 25a, 25b and 35 is composed of an undoped semiconductor.

According to the waveguiding sections 20A and 20B, the input optical coupler 30, and the output optical coupler 40, as described above, large part of the upper cladding layers 25a, 25b, and 35 is composed of an undoped semiconductor and no p-type contact layers are provided. Compared to the structure shown in FIG. 15B, for example, the resistivity of the sections containing an undoped semiconductor can be increased. Thus, when a voltage is applied to the phase shifting section 10, leakage current flowing from one optical waveguide to the other optical waveguide through the waveguiding sections 20A and 20B, the input optical coupler 30, and the output optical coupler 40 can be effectively reduced. As a result, cross-talk between the optical waveguides due to the leakage current can be suppressed.

According to the Mach-Zehnder interferometer type optical modulator 1A of this embodiment, part of the upper cladding layers 15a and 15b of the phase shifting section 10 are composed of an undoped semiconductor so that the optical absorption loss caused by the p-type semiconductor can be reduced as discussed above. Moreover, since part of the upper cladding layers of the waveguiding sections 20A and 20B, the input optical coupler 30, and the output optical coupler 40 are composed of an undoped semiconductor, the optical absorption loss caused by the p-type semiconductor and the leakage current flowing between the optical waveguides can be reduced. Thus, the Mach-Zehnder interferometer type optical modulator 1A achieves lower loss, higher speed, and higher performance compared to, for example, the conventional Mach-Zehnder interferometer type optical modulator having a structure shown in FIG. 15.

Preferably, a p-type contact layer 16a having a dopant concentration higher than that of the second section 152a is formed on the second section 152a of the upper cladding layer 15a of the phase shifting section 10, as in this embodiment. As a result, electrical signals applied to the anode electrode 11a can be efficiently transmitted to the first section 151a and the second section 152a. Similarly, a p-type contact layer 16b having a dopant concentration higher than that of the fifth section 152b of the upper cladding layer 15b is preferably formed on the fifth section 152a of the upper cladding layer 15b. As a result, electrical signals applied to the anode electrode 11b can be efficiently transmitted to the fourth section 151b and the fifth section 152b.

According to the structure of this embodiment in which the mesa structures 19a, 19b, 29a, and 29b are buried by the resin layer 17, the width of the mesa structures 19a, 19b, 29a, and 29b in the direction intersecting the waveguiding direction is preferably 1 µm or more and 2 µm or less to obtain a fundamental transverse mode. Thus, the Mach-Zehnder interferometer type optical modulator 1A can be used in the optical fiber communication.

A preferable width of the second section 152a, the fifth section 152b, the third section 153a, and the sixth section 153b in the direction intersecting the waveguiding direction (hereinafter simply referred to as "transversal width") is as follows. The distribution intensity of the guided light is maximum at the center portions of the mesa structures 19a and 19b in the direction intersecting the waveguiding direction. Thus, when the second section 152a and the fifth section 152b, which are p-type semiconductor layers, are provided in the center portions, optical absorption loss caused becomes relatively high. In other words, in order to reduce the optical absorption loss caused by the p-type semiconductor layer, the transversal width of the second section 152a and the fifth section 152b is preferably sufficiently decreased and these sections are preferably placed in positions remote from the center portions of the mesa structures 19a and 19b. For example, when the transversal width of the second section 152a and the fifth section 152b is in the range of 10% to 30% of the transversal width of the mesa structures 19a and 19b, the range in which the distribution intensity of the guided light is large can be avoided. The transversal width of the third section 153a and the sixth section 153b can be determined by subtracting the transversal width of the second section 152a and the fifth section 152b from the transversal width of the mesa structures 19a and 19b.

The thickness of the first section 151a and the fourth section 151b is, for example, preferably about 0.1 µm. When the thickness of the first section 151a and the fourth section 151b is 0.1 µm or more, a sufficient pin junction potential barrier can be obtained in a pin structure constituted by the n-type lower cladding layer 13, the core layers 14a and 14b composed of an undoped semiconductor, and the first section 151a and the fourth section 151b composed of a p-type semiconductor. As a result, the leakage current such as tunneling current can be effectively suppressed, and a sufficient electric field can be applied to the core layers 14a and 14b. Light in the optical waveguides 2 and 3 is guided in the upper cladding layers 15a and 15b by spreading within the range of 1 µm from the interfaces between the core layers 14a and 14b and the upper cladding layers 15a and 15b. Accordingly, when the first section 151a and the fourth section 151b composed of a p-type semiconductor becomes as thick as this range or thicker, the absorption loss caused by the p-type semiconductor becomes relatively large. Due to this reason, the thickness of the first section 151a and the fourth section 151b is preferably half the range in which the guided light spreads toward the upper cladding layer (e.g., 0.5 µm) or less.

Next, an example of a method for manufacturing the Mach-Zehnder interferometer type optical modulator 1A is described. FIGS. 5A to 12B are cross-sectional views showing manufacturing steps of the Mach-Zehnder interferometer type optical modulator 1A. FIGS. 5A, 6A, 7A, 8A, 9A, 10A, 11A, and 12A show steps of manufacturing the phase shifting section 10 and are cross-sectional views taken along line II-II in FIG. 1. FIGS. 5B, 6B, 7B, 8B, 9B, 10B, 11B, and 12B show steps of manufacturing the waveguiding sections 20A and 20B and are cross-sectional views taken along line in FIG. 1. The steps of manufacturing the input optical coupler 30 and the output optical coupler 40 are the same as those of manufacturing the waveguiding sections 20A and 20B except for the number of mesa structures.

Figure 5A:
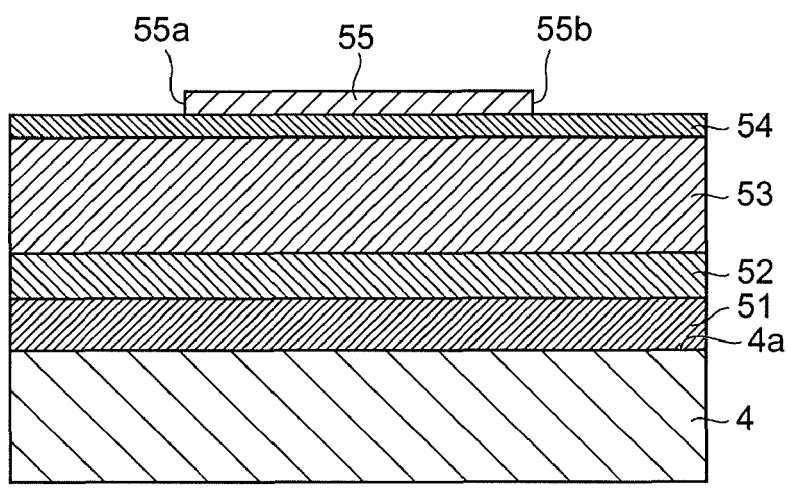
FIGS. 5A and 5B are cross-sectional views illustrating steps of making the Mach-Zehnder interferometer type optical modulator 1A.
Figure 5B:
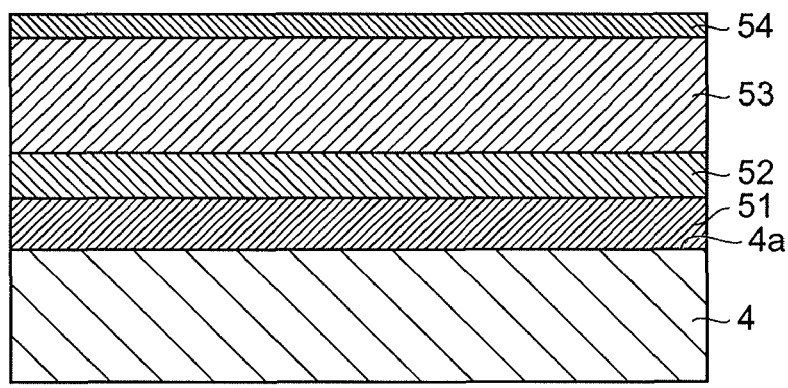

First, as shown in FIGS. 5A and 5B, an n-type InP is prepared as the n-type semiconductor substrate 4. An n-type semiconductor layer 51, an undoped semiconductor layer 52, a p-type semiconductor layer 53, and a p-type semiconductor layer 54 are sequentially grown on the main surface 4a of the n-type semiconductor substrate 4. Each of the layers 51 to 54 is grown by a crystal growth method such as metal organic vapor phase epitaxy (MOVPE) or molecular beam epitaxy (MBE). The n-type semiconductor layer 51 and the p-type semiconductor layer 53 are composed of, for example, one of InP, GaInAsP, AlGaInAs, and AlInAs. The undoped semiconductor layer 52 is composed of, for example, a semiconductor material selected from InP, GaInAsP, AlGaInAs, AlInAs, and GaInAs, the semiconductor material having a band gap energy smaller and a refractive index larger than those of the n-type semiconductor layer 51 and the p-type semiconductor layer 53. In order to grow the n-type semiconductor layer 51, an n-type dopant such as Si or Se is added. In order to grow the p-type semiconductor layers 53 and 54, a p-type dopant such as Zn is added.

As shown in FIG. 5A, part of the surface of the p-type semiconductor layer 54 is covered with a dielectric mask 55. The covered part corresponds to the phase shifting section 10 above the n-type semiconductor substrate 4. The dielectric mask 55 is formed so that a side surface 55a of the dielectric mask 55 extends in the waveguiding direction of the optical waveguide 2 and another surface 55b of the dielectric mask 55 extends in the waveguiding direction of the optical waveguide 3. The dielectric mask 55 is also formed so that these side surfaces 55a and 55b are located on the sections where the optical waveguides 2 and 3 are to be formed. For example, SiO$_2$ or SiN may be used as the material for the dielectric mask 55.

Figure 6A:
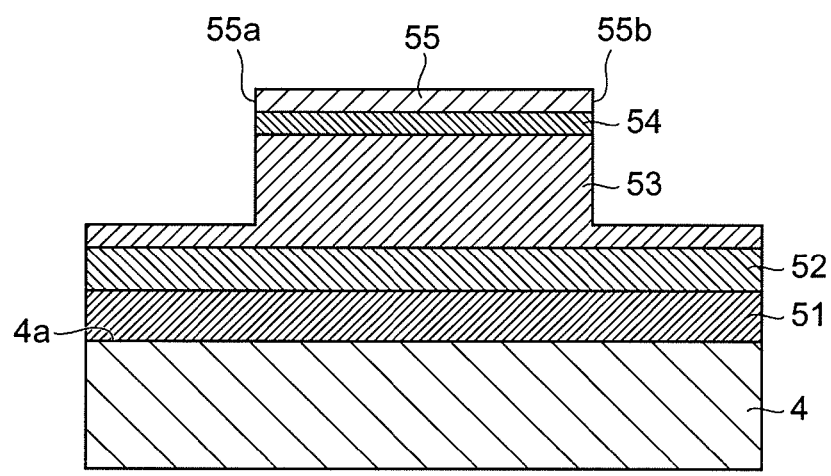
FIGS. 6A and 6B are cross-sectional views illustrating steps of making the Mach-Zehnder interferometer type optical modulator 1A.
Figure 6B:
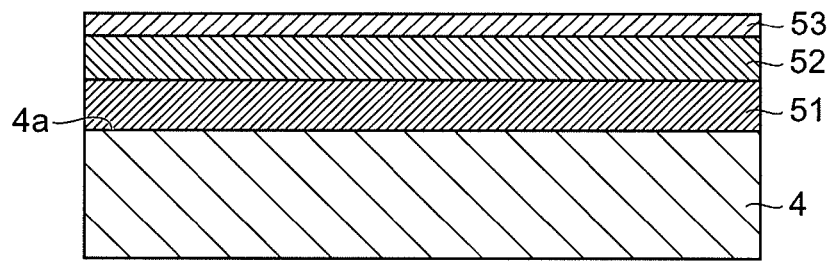

Next, as shown in FIG. 6A, sections of the p-type semiconductor layer 54 and the p-type semiconductor layer 53 where the phase shifting section 10 is to be formed are etched using the dielectric mask 55. The etching depth is set so that part of the p-type semiconductor layer 53 remains unetched. The portions of the p-type semiconductor layers 53 and 54 covered with the dielectric mask 55 remain unetched. As shown in FIG. 6B, in the sections where the waveguiding sections 20A and 20B are to be formed, the p-type semiconductor layer 54 is removed by, for example, dry etching.

Figure 7A:
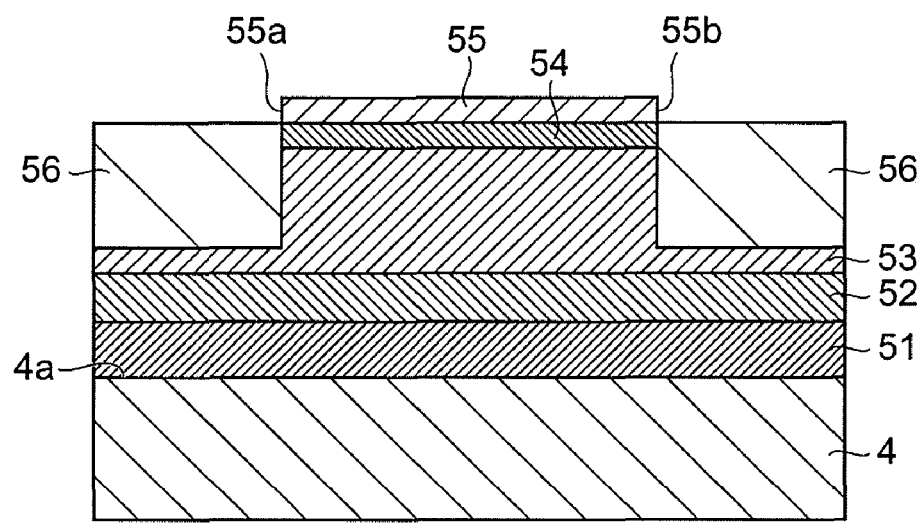
FIGS. 7A and 7B are cross-sectional views illustrating steps of making the Mach-Zehnder interferometer type optical modulator 1A.
Figure 7B:
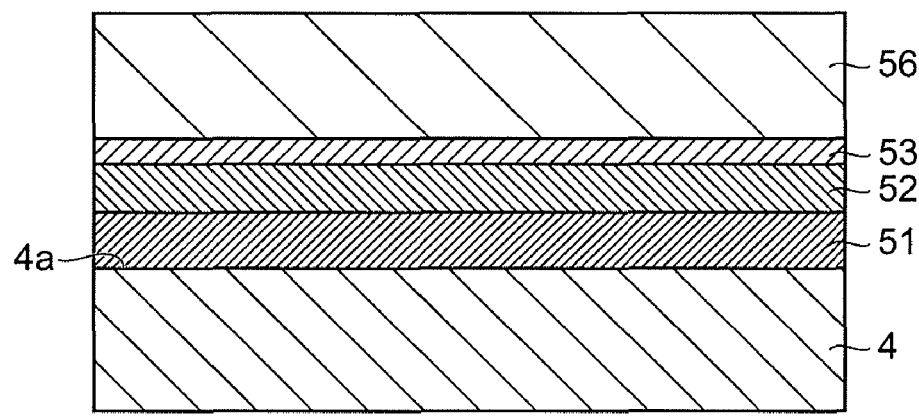

Referring now to FIGS. 7A and 7B, an undoped semiconductor layer 56 is re-grown on the etched sections of the p-type semiconductor layer 53 and the etched section of the p-type semiconductor layer 54. The undoped semiconductor layer 56 is composed of for example, a semiconductor material selected from InP, GaInAsP, AlGaInAs, AlInAs, and GaInAs, and the semiconductor material preferably has the same composition as the p-type semiconductor layer 53. As shown in FIG. 7A, the undoped semiconductor layer 56 does not grow in the region where the dielectric mask 55 is present. The undoped semiconductor layer 56 selectively grows only on the etched sections of the p-type semiconductor layer 53.

Figure 8A:
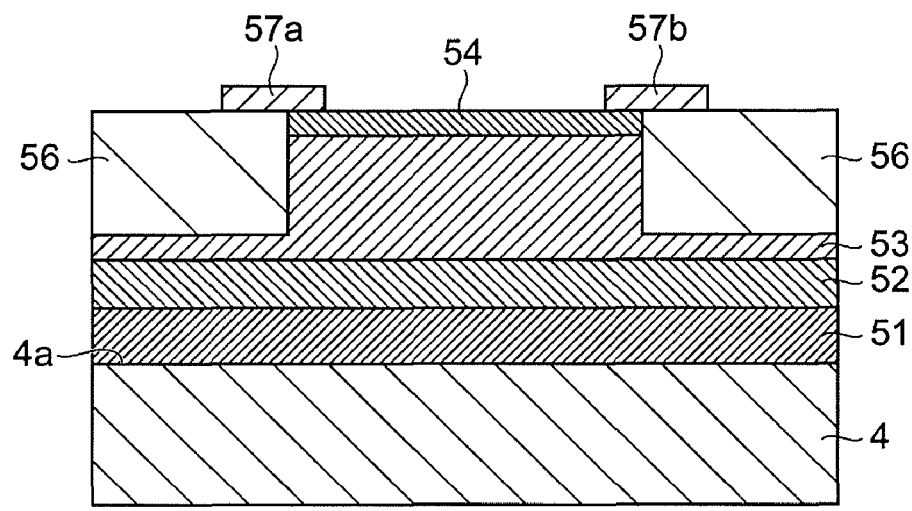
FIGS. 8A and 8B are cross-sectional views illustrating steps of making the Mach-Zehnder interferometer type optical modulator 1A.
Figure 8B:
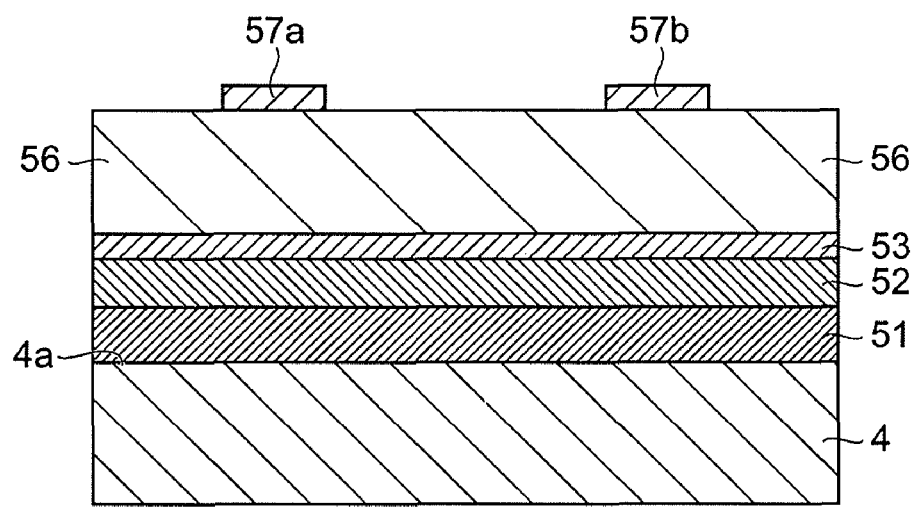

The dielectric mask 55 is then removed. As shown in FIGS. 8A and 8B, dielectric masks 57a and 57b are respectively formed on the sections above the n-type semiconductor substrate 4 where the optical waveguides 2 and 3 are to be formed. In FIG. 8A, the dielectric masks 57a and 57b are formed on the p-type semiconductor layer 53 on the borders between the etched sections and the unetched sections. For example, SiO$_2$ or SiN may be used as the material for the dielectric masks 57a and 57b. Dielectric masks are also formed on the sections where the mesa structures 39 shown in FIG. 4 are to be formed in the sections where the input optical coupler 30 and the output optical coupler 40 are to be formed.

Figure 9A:
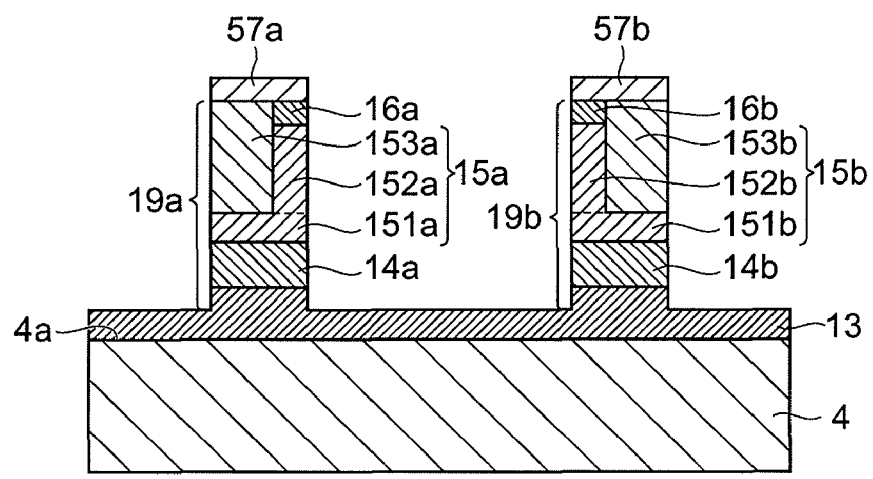
FIGS. 9A and 9B are cross-sectional views illustrating steps of making the Mach-Zehnder interferometer type optical modulator 1A.
Figure 9B:
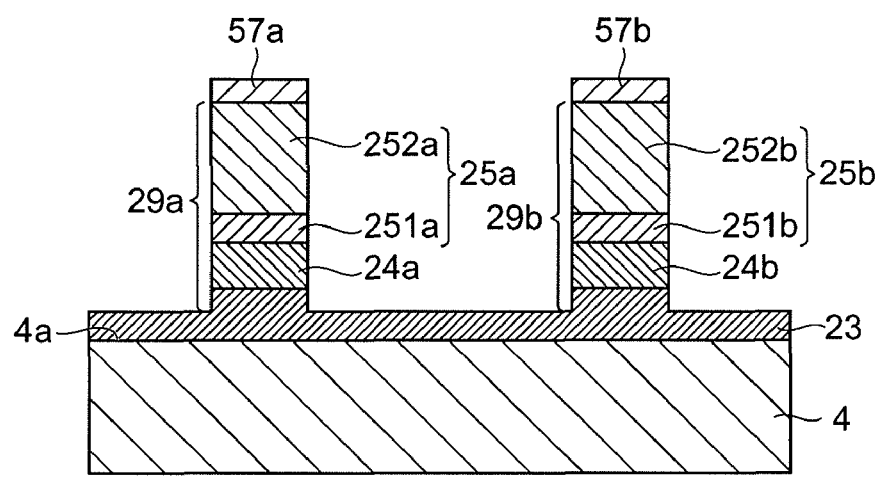

Referring now to FIGS. 9A and 9B, the semiconductor layers are etched using the dielectric masks 57a and 57b as etching masks by, for example, dry etching method. Etching is preferably conducted until part of the n-type semiconductor layer 51 is reached. As a result of the etching, the difference in refractive index between the mesa structure and its peripheral regions can be increased and guided light can be sufficiently confined in the mesa structure. If needed, etching may be conducted until part of the n-type semiconductor substrate 4 is reached. As a result of this step, the n-type lower cladding layer 13 is formed in the section where the phase shifting section 10 is to be formed. The n-type lower cladding layer 23 is formed in the sections where the waveguiding sections 20A and 20B are to be formed. The portion covered with the dielectric mask 57a remains as the mesa structures 19a and 29a. The portion covered with the dielectric mask 57b remains as the mesa structures 19b and 29b. As shown in FIG. 9A, the mesa structure 19a includes part of the n-type lower cladding layer 13, the core layer 14a, the upper cladding layer 15a (first section 151a, second section 152a and third section 153a), and the p-type contact layer 16a. Similarly, the mesa structure 19b includes part of the n-type lower cladding layer 13, the core layer 14b, the upper cladding layer 15b (fourth section 151b, fifth section 152b and sixth section 153b), and the p-type contact layer 16b. As shown in FIG. 9B, the mesa structure 29a includes part of the n-type lower cladding layer 23, the core layer 24a, and the upper cladding layer 25a (seventh section 251a and eighth section 252a). Similarly, the mesa structure 29b includes part of the n-type lower cladding layer 23, the core layer 24b, and the upper cladding layer 25b (seventh section 251b and eighth section 252b).

Figure 10A:
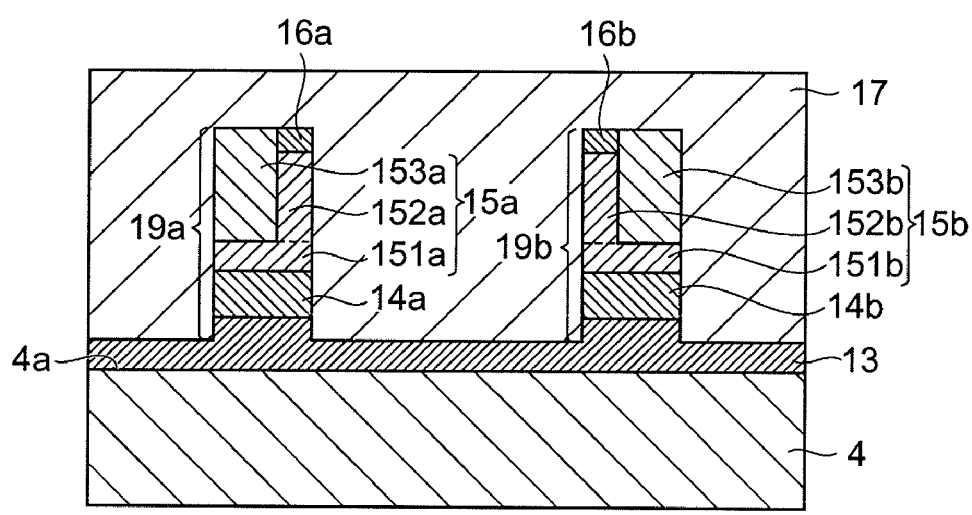
FIGS. 10A and 10B are cross-sectional views illustrating steps of making the Mach-Zehnder interferometer type optical modulator 1A.
Figure 10B:
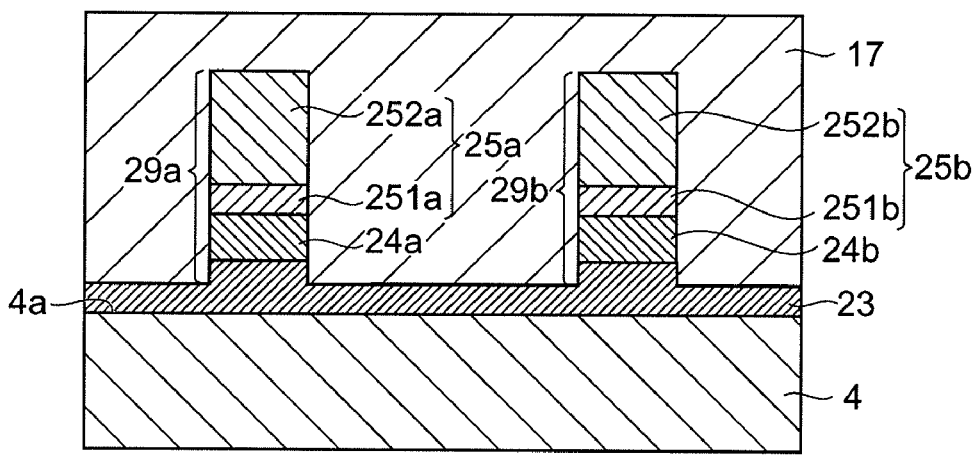
Figure 11A:
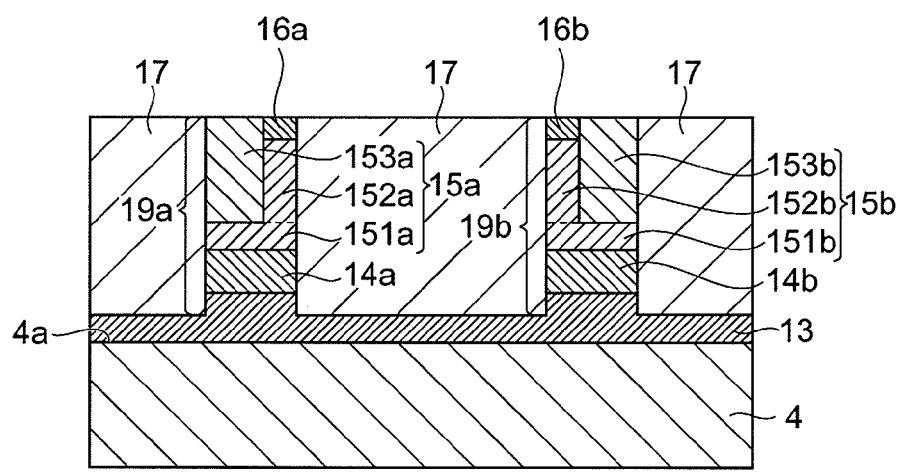
FIGS. 11A and 11B are cross-sectional views illustrating steps of making the Mach-Zehnder interferometer type optical modulator 1A.
Figure 11B:
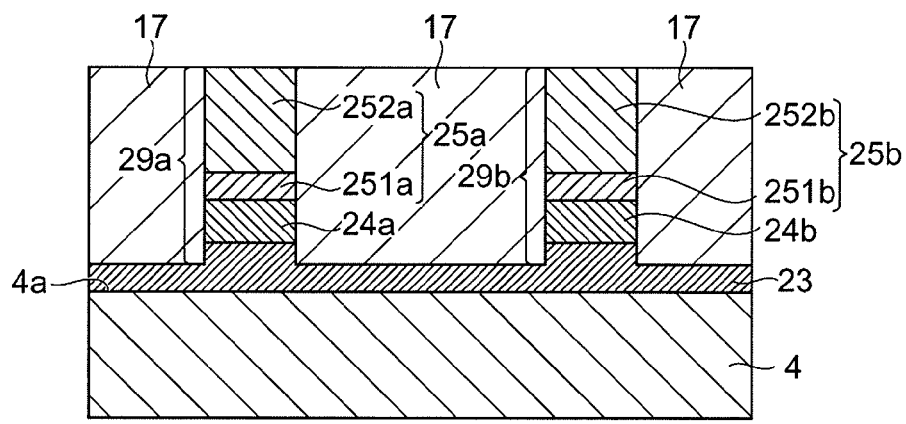
Figure 12A:
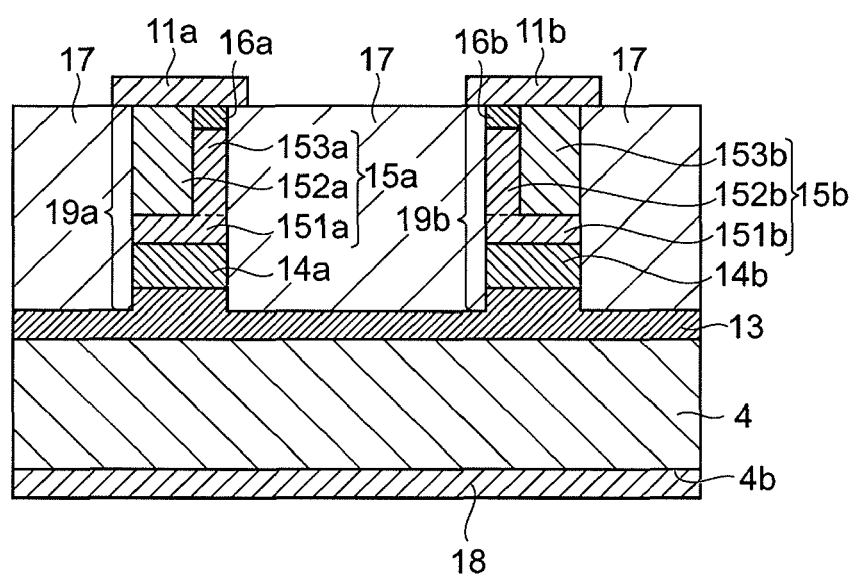
FIGS. 12A and 12B are cross-sectional views illustrating steps of making the Mach-Zehnder interferometer type optical modulator 1A.
Figure 12B:
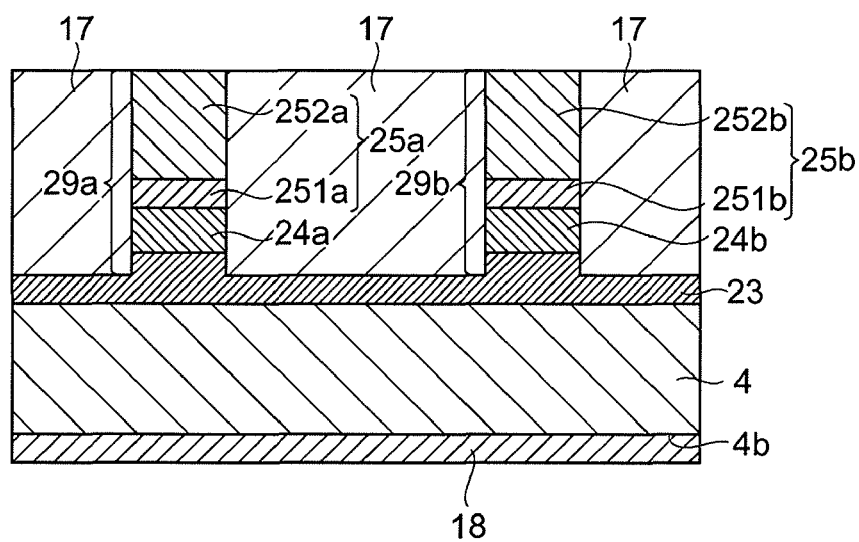

Referring to FIGS. 10A and 10B, the resin layer 17 is formed over the entire surface of the n-type semiconductor substrate 4 to bury the mesa structures 19a, 19b, 29a, and 29b. BCB resin or polyimide resin can be used in the resin layer 17. Referring to FIGS. 11A and 11B, the surface of the resin layer 17 is etched by dry etching or the like to remove the surface layer portion of the resin layer 17 and to expose the top portions of the mesa structures 19a, 19b, 29a, and 29b. Then, as shown in FIG. 12A, the anode electrodes 11a and 11b are respectively formed on the mesa structures 19a and 19b of the phase shifting section 10. The anode electrodes 11a and 11b may be formed by, for example, vapor deposition or sputtering.

Then, the rear surface of the n-type semiconductor substrate 4 is polished to reduce the thickness to a certain level (e.g., about 100 µm) and the cathode electrode 18 is formed on the rear surface 4b of the polished semiconductor substrate 4. The cathode electrode 18 can be formed by, for example, an evaporation method or a sputtering method. As a result, the Mach-Zehnder interferometer type optical modulator 1A is made.

Second Embodiment

Figure 13:
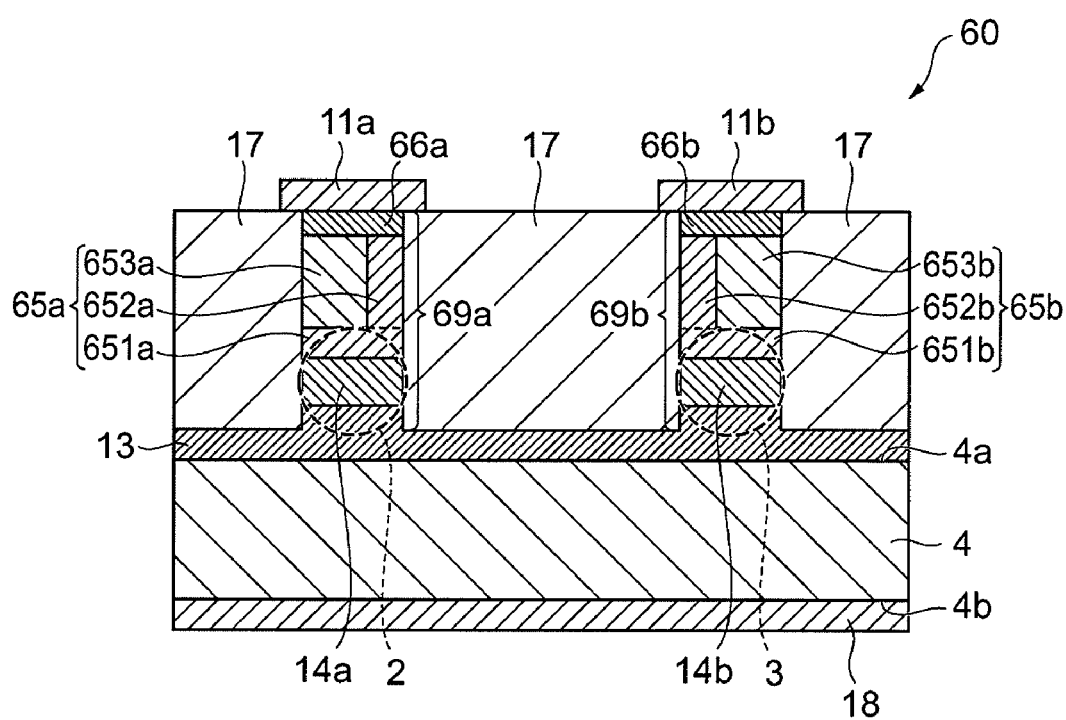
FIG. 13 is a cross-sectional view showing a structure of a phase shifting section of a modification example.
Figure 14:
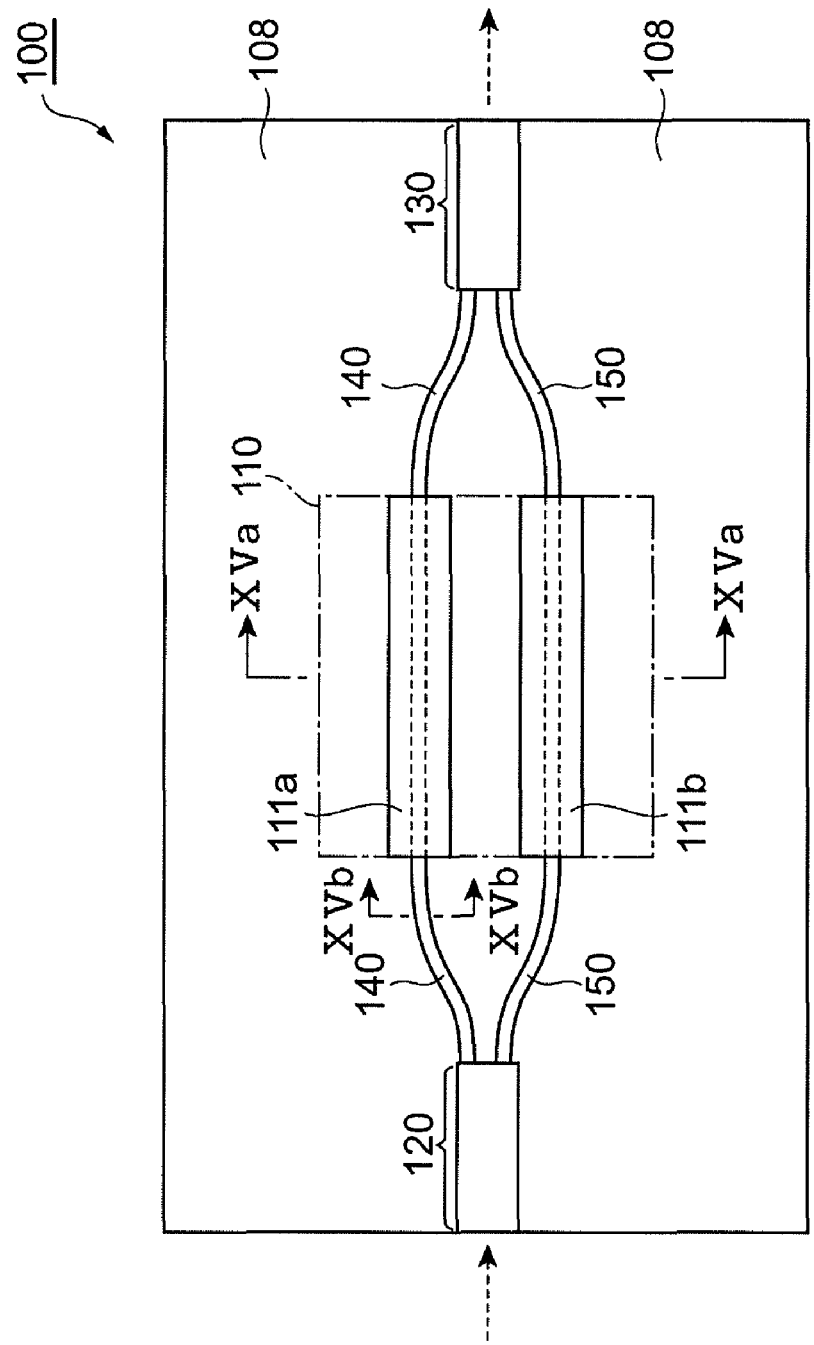
FIG. 14 is a plan view showing a structure of a Mach-Zehnder interferometer type optical modulator having a pin structured optical waveguide.

Next, a second embodiment which is a modification of the Mach-Zehnder interferometer type optical modulator 1A of the first embodiment is described. FIG. 13 is a cross-sectional view showing a structure of a phase shifting section 60 as a modification example.

The phase shifting section 60 includes anode electrodes 11a and 11b, an n-type lower cladding layer 13, a cathode electrode 18, and two mesa structures 69a and 69b. The structure other than the mesa structures 69a and 69b are the same as that of the first embodiment.

The mesa structure 69a is a first optical waveguide structure of this embodiment and is formed on the n-type lower cladding layer 13 in the section corresponding to the optical waveguide 2. The mesa structure 69b is a second optical waveguide structure of this embodiment and is formed on the n-type lower cladding layer 13 in the section corresponding to the optical waveguide 3.

The mesa structure 69a includes a core layer 14a, an upper cladding layer 65a, and a p-type contact layer 66a. Similarly, the mesa structure 69b includes a core layer 14b, an upper cladding layer 65b, and a p-type contact layer 66b. The structure of the core layers 14a and 14b is the same as that of the first embodiment.

The upper cladding layer 65a includes a first section 651a, a second section 652a, and a third section 653a. The structure of the first section 651a and the second section 652a is the same as that of the first section 151a and the second section 152a of the first embodiment. The structure of the third section 653a is the same as that of the third section 153a of the first embodiment except for the following. That is, whereas the third section 153a of the first embodiment has the upper most part reaching to the top of the mesa structure 19a, the third section 653a of the second embodiment has the upper most part at the same level as the second section 652a. The p-type contact layer 66a extends across the second section 652a and the third section 653a.

The upper cladding layer 65b includes a fourth section 651b, a fifth section 652b, and a sixth section 653b. The structure of the fourth section 651b and the fifth section 652b is the same as that of the fourth section 151b and the fifth section 152b of the first embodiment. The structure of the sixth section 653b is the same as that of the sixth section 153b of the first embodiment except for the following. That is, whereas the sixth section 153b of the first embodiment has the upper most part reaching to the top of the mesa structure 19b, the sixth section 653b of the second embodiment has the upper most part at the same level as the fifth section 652b. The p-type contact layer 66b extends across the fifth section 652b and the sixth section 653b.

According to the second embodiment, since the p-type contact layer 66a is formed on the third section 653a composed of an undoped semiconductor, the contact area between the p-type contact layer 66a and the anode electrode 11a is increased and the contact resistance can be lowered. Since the p-type contact layer 66b is formed on the sixth section 653b composed of an undoped semiconductor, the contact area between the p-type contact layer 66b and the anode electrode 11b is increased and the contact resistance can be lowered. According to this modification, the contact resistance can be lowered and operation at lower voltage and lower power consumption is made possible compared to the first embodiment.

Figure 15B:
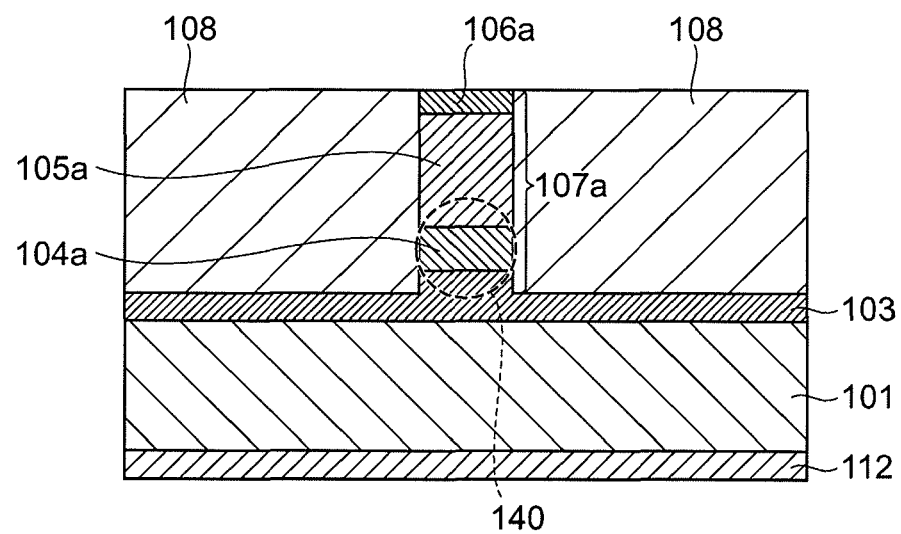
FIG. 15B is a cross-section taken along line XVb-XVb in FIG. 14.

The semiconductor optical device and the Mach-Zehnder interferometer type optical modulator of the present invention are not limited to the aforementioned embodiments and various modifications are possible. For example, regarding the upper cladding layers (second cladding layers) of the input optical coupler, the waveguiding sections, and output optical coupler of the embodiments described above, a layer (seventh section) composed of a p-type semiconductor is formed only in a section that contacts the core layer, other sections are composed of an undoped semiconductor, and no contact layers are provided. The structure of the second cladding layers of the input optical coupler, the waveguiding sections, and the output optical coupler are not limited to this. For example, as shown in FIG. 15B, the second cladding layers may be composed of a p-type semiconductor and p-type contact layers may be further provided thereon. Alternatively, the entire second cladding layers may be composed of an undoped semiconductor only.

In the embodiments described above, mesa structures are described as an example of the optical waveguide structure. However, the optical waveguide structure of the present invention is not limited to this. For example, any other structure such as a ridge structure and buried heterostructure may be employed. Any optical waveguide structure can easily realize a low-loss, high-speed, and high-performance semiconductor optical device and a Mach-Zehnder interferometer type optical modulator as long as the features of the present invention are fulfilled.

Although an n-type semiconductor substrate is described as an example of the substrate in the embodiments described above, the substrate to be used in the semiconductor optical device and Mach-Zehnder interferometer type optical modulator of the present invention is not limited to this. A substrate having other electrical characteristics, such as an undoped semiconductor substrate or a semi-insulating semiconductor substrate, may be used.

In the method for manufacturing the Mach-Zehnder interferometer type optical modulator according to the embodiments described above, a method of adding a p-type dopant during growth of a p-type semiconductor (first section, second section, p-type contact layer, etc.) is described as an example. Alternatively, a p-type semiconductor may be prepared by other methods of adding a p-type dopant, such as ion injection and thermal diffusion.

Although the principle of the present invention has been described heretofore through preferred embodiments, persons skilled in the art should recognize that alterations and modifications of details may be made without departing from the principle. All modifications and alterations which come within the scope of the claims and the spirit of the present invention are covered and protected.

What is claimed is:

1. A Mach-Zehnder interferometer type optical modulator comprising:
  a first optical waveguide and a second optical waveguide;
  an input optical coupler optically connected to one end of each of the first and second optical waveguides;
  an output optical coupler optically connected to the other end of each of the first and second optical waveguides; and
  a phase shifting section disposed between the input optical coupler and the output optical coupler,
  wherein the phase shifting section constitutes part of the first optical waveguide and part of the second optical waveguide and includes a first optical waveguide structure and a second optical waveguide structure each including an n-type semiconductor section, a core layer on the n-type semiconductor section, and a cladding layer on the core layer, the cladding layer of the first optical waveguide structure includes a first section disposed on the core layer of the first optical waveguide structure, and a second section and a third section disposed on the first section, the second section and the third section being juxtaposed to each other in a direction that intersects a waveguiding direction of the first optical waveguide structure, the cladding layer of the second optical waveguide structure includes a fourth section disposed on the core layer of the second optical waveguide structure, and a fifth section and a sixth section disposed on the fourth section, the fifth section and the sixth section being juxtaposed to each other in a direction that intersects a waveguiding direction of the second optical waveguide structure, and the first section, the second section, the fourth section, and the fifth section are composed of a p-type semiconductor, and the third section and the sixth section are composed of an undoped semiconductor.

2. The Mach-Zehnder interferometer type optical modulator according to claim 1, wherein the first and second optical waveguide structures each have a mesa structure that includes part of the n-type semiconductor section, the core layer, and the cladding layer.

3. The Mach-Zehnder interferometer type optical modulator according to claim 2, wherein side surfaces of the mesa structure are buried by a resin layer.

4. The Mach-Zehnder interferometer type optical modulator according to claim 3, wherein the resin layer is composed of a polyimide resin or a benzocyclobutene (BCB) resin.

5. The Mach-Zehnder interferometer type optical modulator according to claim 1, further comprising a first electrode and a second electrode respectively disposed on cladding layers of the first optical waveguide structure and the second optical waveguide structure.

6. The Mach-Zehnder interferometer type optical modulator according to claim 1, wherein at least one of the first and second optical waveguides excluding the phase shifting section, the input optical coupler, and the output optical coupler has a third waveguide structure that includes a core layer and a cladding layer disposed on the core layer, the cladding layer of the third optical waveguide structure includes a seventh section disposed on the core layer of the third optical waveguide structure and an eighth section disposed on the seventh section, and the seventh section is composed of a p-type semiconductor and the eighth section is composed of an undoped semiconductor.

7. The Mach-Zehnder interferometer type optical modulator according to claim 1, further comprising:

a first p-type contact layer disposed on the second section and having a dopant concentration higher than that in the second section, and a second p-type contact layer disposed on the fifth section and having a dopant concentration higher than that in the fifth section.

8. The Mach-Zehnder interferometer type optical modulator according to claim 7, wherein the first p-type contact layer extends across the second section and the third section, and the second p-type contact layer extends across the fifth section and the sixth section.

9. The Mach-Zehnder interferometer type optical modulator according to claim 7, further comprising a first electrode and a second electrode respectively disposed on cladding layers of the first optical waveguide structure and the second optical waveguide structure, wherein the first and second electrodes are in contact with the first and second p-type contact layers, respectively.

10. The Mach-Zehnder interferometer type optical modulator according to claim 1, wherein the core layers of the first and second optical waveguide structures are composed of a semiconductor material selected from GaInAsP, AlGaInAs, AlInAs, and GaInAs.

11. The Mach-Zehnder interferometer type optical modulator according to claim 1, wherein the cladding layers and the n-type semiconductor sections of the first and second optical waveguide structures are composed of InP.

* * * * *